(12) United States Patent  
Rosen

(10) Patent No.: US 8,893,739 B2
(45) Date of Patent: Nov. 25, 2014

(54) MAINTENANCE DEVICE, AND METHOD FOR INTRODUCING A MAINTENANCE TOOL INTO AN ELONGATE HOLLOW MEMBER

(75) Inventor: Hermann Rosen, Kastanienbaum (CH)

(73) Assignee: Rosen Swiss AG, Stans (CH)

( * ) Notice: Subject to any disclaimer, the term of this patent is extended or adjusted under 35 U.S.C. 154(b) by 688 days.

(21) Appl. No.: 13/131,276

(22) PCT Filed: Nov. 24, 2009

(86) PCT No.: PCT/EP2009/008356
§ 371 (c)(1),
(2), (4) Date: Jul. 11, 2011

(87) PCT Pub. No.: WO2010/060594
PCT Pub. Date: Jun. 3, 2010

(65) Prior Publication Data
US 2011/0259594 A1  Oct. 27, 2011

(30) Foreign Application Priority Data

Nov. 26, 2008 (DE) .......................... 10 2008 059 061

(51) Int. Cl.
*F16L 41/06* (2006.01)
*B23B 41/08* (2006.01)
*F16L 55/46* (2006.01)

(52) U.S. Cl.
CPC *F16L 55/46* (2013.01); *F16L 41/06* (2013.01)
USPC ........................................ 137/15.14; 137/318

(58) Field of Classification Search
USPC ............................ 137/317, 318, 15.13, 15.14
See application file for complete search history.

(56) References Cited

U.S. PATENT DOCUMENTS

| 5,101,545 A | 4/1992 | Mori |
| 6,416,263 B1 | 7/2002 | Sato |
| 6,622,747 B2 * | 9/2003 | Sato et al. ...................... 137/318 |

FOREIGN PATENT DOCUMENTS

| DE | 44 29 874 A1 | 2/1996 |
| EP | 0 935 089 B1 | 8/1999 |
| JP | 2003 148680 A | 5/2011 |

* cited by examiner

*Primary Examiner* — Kevin Lee
(74) *Attorney, Agent, or Firm* — Gudrun E. Huckett

(57) ABSTRACT

Disclosed is a maintenance device for an elongate, tubular hollow member (2) designed to conduct a fluid. Said maintenance device comprises a sealing mechanism (4) which is to seal a working zone (9) relative to surroundings (30) of the hollow member (2) and can be moved in one direction along the hollow member (2). A side of the sealing mechanism (4) that faces the hollow member (2) forms an at least partially curved surface and can be moved in the longitudinal direction of the hollow member (2), especially in order to be placed in the sealing position. A method for servicing an elongate, tubular hollow member (2) is also claimed.

42 Claims, 18 Drawing Sheets

MAINTENANCE DEVICE, AND METHOD FOR INTRODUCING A MAINTENANCE TOOL INTO AN ELONGATE HOLLOW MEMBER

BACKGROUND OF THE INVENTION

The invention concerns a maintenance device for an elongated, tubular hollow body which is configured for conducting a fluid, with a sealing device which is provided for sealing the working region from an environment of the hollow body and can be moved along the hollow body in a direction. The invention further relates to a maintenance device for an elongated, tubular hollow body which is configured for conducting a fluid, in particular with an adapter as part of a sealing device, which adapter can be attached to the hollow body in a sealing manner, has a surface pointing away from the hollow body and jointly forms a working region allowing access to the hollow body, and with a sealing device which is provided for sealing the working region from an environment of the hollow body; and to a method for introducing a maintenance tool into an above-described hollow body for maintaining an elongated, tubular hollow body which is configured for conducting a fluid, with a sealing device being attached to the hollow body in a sealing manner, in such a way that a working region is formed for forming an opening in the hollow body, the working region being sealed by the sealing device from an environment of the hollow body, and the sealing device being movable along the hollow body in a direction. The hollow body is in particular a pipeline for the conducting of for example gas, water or oil.

Tubular hollow bodies, i.e. basically conduits or pipelines, often lie for a long time in inhospitable areas and have to be maintained regularly owing to ageing processes. Access to the pipeline, which is furthermore often earth-laid, is in many cases difficult. There are a number of technologies, by way of which an opening can be formed in a pipeline and by way of which maintenance tools—for example cleaning pigs—can be introduced into the pipeline, for maintaining pipelines of this type, in particular for introducing a maintenance tool into a pipeline.

A device of the aforementioned kind is known from EP 0 935 089 81. This document discloses a device and a method for cutting into a conduit, in which a sealing device in the form of a housing is moved transversely to the longitudinal extension of the conduit and thus along the circumference of the conduit. The device sits tight on the conduit. The housing seals the working space, located between the two device parts which are set apart from each other in the longitudinal direction of the conduit, from an environment of the conduit. The working space or region becomes accessible by opening or removing the housing. The working space is large based on the cross section of the pipeline to be maintained, so that further operation of the conduit without sealing the cut formed in the pipe wall decisively influences the flow in the conduit. In addition, maintenance tools which can be introduced into the line are guided into the line in all cases at an angle and can, precisely owing to the turbulence resulting from the influencing of the flow, easily become jammed in the conduit.

The object of the present invention is to provide a maintenance device and a method for introducing a maintenance access that are improved over the prior art.

SUMMARY OF THE INVENTION

The object is achieved by a maintenance device wherein a side of the sealing device that is to be turned toward the hollow body forms an at least partly curved surface and can be moved in the direction along the hollow body, in particular for assuming the sealing position; by a maintenance device that is further characterized by a housing which is provided to form at least one chamber, which can be separated from the working region by means of the sealing device, and which comprises a displaceable insert which is configured for introducing a maintenance tool into the hollow body; and a method that is characterized in that the underside of the sealing device is adapted in terms of shape to the curvature of the hollow body and the working region is released, viewed from a side of the sealing device that is remote from the hollow body, by displacing at least a curved part of the sealing device along the hollow body.

The maintenance device according to the invention is distinguished in that an (under)side of the sealing device forms an at least partly curved surface and can be moved in the direction along the hollow body, in particular for assuming and/or preserving the sealing position. The curvature of the surface follows the curvature of the conduit, although it is not necessarily but rather merely preferably identical thereto. The shape of the side of the sealing device that is to be turned toward the conduit is thus adapted to the shape of the tubular hollow body; this can reduce the size of the working region and minimize the influence of the working region on a flowing current when a conduit is opened. At the same time, for the extension of the sealing device in a direction perpendicular to the underside, less overall space is required for side walls for example of an adapter associated with the sealing device, so that the maintenance device in the described embodiment is overall smaller. This is advantageous for earth-laid pipelines. Despite any references to the conduit to be maintained or the hollow body to be maintained, said hollow body is not part of the maintenance device according to the invention.

The movability of the sealing device along the longitudinal extension of the hollow body and in a direction transverse thereto increases the flexibility of the sealing device for the introduction of maintenance tools. For example, the sealing device is moved along the longitudinal extension of the adapter and/or the conduit/the hollow body, whereas the maintenance tool can be introduced at an angle thereto directly into the line.

The maintenance device according to the invention can in this case be provided in particular with an adapter as part of the sealing device, which adapter can be attached to the hollow body in a sealing manner, has a surface pointing away from the hollow body and jointly forms a working region allowing access to the hollow body. The sealing device thus has parts which can be moved along the adapter and relative thereto and can seal and release the working region. The term "working region" refers in this case in particular to the region in which the conduit wall is acted on using maintenance tools such as cutting, milling, measuring means and which is to be sealed from the environment when the conduit is opened or the hollow body is opened.

In particular in the case of a curved surface of the adapter of the sealing device, which surface is directed away from the conduit, or of parts of the sealing device that can move directly on the conduit surface, said sealing device can nestle tight against the conduit or against the adapter or be supported on said adapter, thus producing in each case—if appropriate using further sealing means—a sealing fit between the sealing device and conduit. The sealing device is, precisely in the case of a flat, curved adapter, formed for example by clamping, adapted on its underside, at least in the region which can be moved along the side of the adapter that faces the further parts of the sealing device and that can be moved along the working region during movement of the sealing device, to the adapter. The working region is thus kept particularly small; this further minimizes the influence of the missing wall part of a conduit which has already been opened.

In an advantageous development of the invention, the maintenance device has a housing which is provided to form at least one chamber which can be separated from the working region by means of the sealing device. In a chamber of this type, which is pressure-tight relative to the further environment of the maintenance device, it is possible to store maintenance tools which can be introduced, during opening of the sealing device, into the tubular hollow body, the environment being further sealed. The housing thus seals the opening in the maintenance device from the environment. Preferably, the housing is arranged at least partly around the sealing device if said sealing device is itself adapted, in terms of its shape, to the hollow body to be maintained. The housing can contain maintenance tools which, owing to the sealing of the housing from the environment, can be inserted into the line even when said line is still in operation. In this case, the housing may become flooded, so that means can be provided on the housing for pumping out or draining the fluid. The overall space which is saved owing to the formation of the sealing device and the adapter can benefit the housing.

In a further advantageous development of the invention, the housing has housing portions forming at least two chambers. These chambers can contain different maintenance tools which can be inserted into the hollow body via the opening. The chambers can be arranged on the sides of the housing that oppose the hollow body to be maintained; they can also merge with one another and be arranged partly on one another.

Advantageously, the housing is arranged on the sealing device and in particular provided with an outer side which rests against the sealing device. The sealing device and housing enter into contact to form a sealing fit, if appropriate using sealing means located between the surfaces arranged on one another. The abutment of the housing against the sealing device saves further overall space. Such a saving of overall space is achieved, albeit to a reduced extent, by a maintenance device in which the housing is connected directly to the adapter.

Particular advantages are furthermore displayed by a maintenance device in which the housing is movable relative to the adapter and/or further parts of the sealing device, for example sliding shells. In particular, individual chambers can be moved, with the maintenance tools or devices located therein, into a position—in particular by rotation of the housing about a longitudinal axis of the hollow body—in which the maintenance tool can be optimally introduced into the opening, or in which the maintenance tool can be inserted into the housing via accesses preferably provided in said housing. Depending on the embodiment of the invention, the sealing device can in this case also be moved together with the housing on the adapter.

The object is furthermore achieved by a maintenance device according to the preamble of claim 19, which device is distinguished by a housing which forms a chamber and comprises a displaceable insert which is configured for introducing a maintenance tool into the hollow body. The insert allows the maintenance tool to be introduced into the conduit, thus ruling out the risk of jamming in the conduit. A maintenance tool comprising an insert of this type also advantageously develops a subject-matter according to claim 1, so that the developments described hereinafter develop both the subject-matter according to claim 1 and the subject-matter according to claim 19. The features described hereinbefore of developments according to the invention of claim 1, in particular with regard to the embodiments of a housing, can also advantageously develop a subject-matter according to claim 19.

The insert, which is configured for introducing a maintenance tool into the hollow body, if appropriate jointly forms the chamber formed by the housing and can, in particular when the sealing device is opened, be displaceable into the pipe. In particular, it is likewise tubular or formed on the basis of a tube shape in order securely to accommodate and to guide a maintenance tool. The insert can in this case receive and serve to position a maintenance tool which is to be inserted into the conduit.

Advantageously, the insert is configured to introduce a maintenance tool in the longitudinal direction of the hollow body. The insert comprises for this purpose a lower region which can be introduced into the hollow body and causes deflection of the tool, which is attached at an angle, in the longitudinal direction of the hollow body. The insert is for example a J-shaped and tubular insert which protrudes with its part directed away from the conduit at right angles (in the case of a maintenance device attached to the hollow body) away from the hollow body but with its other end, when inserted into the conduit, can guide the tool into the line. A curved end of this type can be accommodated in a widened base region of the housing, whereas the remainder of the housing is for example also tubular in its configuration. Inserts arranged rotatably in the housing can also have advantages for introducing tools into the hollow body.

For insertion of a maintenance tool, for example a cleaning pig, into the hollow body with as few interruptions as possible, the insert has throughflow openings through which the flow is interrupted only slightly when the insert is located in the line. The openings are thus preferably in the region of the insert that is introduced into the hollow body and are distributed over the hollow body cross section, i.e. generally over the conduit cross section. The operation of the conduit can thus be continued without significant interruptions.

Advantageously, the maintenance device is provided with at least two inserts which are configured for introducing a maintenance tool in different conduit directions. As a result, one and the same maintenance device, which is arranged on a hollow body, can be used to carry out maintenance operations in both longitudinal directions of the hollow body.

Particularly preferably, the housing is configured as an adapter housing with an access opening. A preferably transportable chamber having a maintenance tool can then be attached to the adapter housing. The maintenance tool can then be inserted, as in the conventional hot tap methods, into the conduit via the housing and any insert forming a guide. The insert is in this case preferably S-shaped and tubular.

In a further advantageous development, the maintenance device according to the invention is distinguished as a result of the fact that the sealing device can be moved, based on the surface of the conduit, at least in a first direction and a second direction running transversely to the first. The at least one functional unit, which is formed in a simple exemplary embodiment by the sealing device itself in the form of a cover, can be moved, based on the surface of the hollow body to be maintained, along a two-dimensional movement pattern. An oval, substantially rectangular or otherwise shaped opening can be produced along the hollow body, which is for example configured as a conduit, while at the same time the sealing device continues to seal the working region adjoining the wall of the hollow body from the environment of the hollow body on the side of the sealing device that is remote from the conduit or the hollow body. The sealing device itself thus performs a two-dimensional movement which, depending on the embodiment of the functional unit, can simplify the maintenance of the hollow body. For example, the working region, which extends in a planar manner, can be made accessible from various edge regions depending on how far and to where the movable parts of the sealing device are displaced along the conduit or the adapter.

Instead of the possible movement, known in the art, of the sealing device in a direction, for example in the circumferential direction along a cylinder lateral surface, and in the opposite direction thereto, the sealing device can also be moved in a direction running transversely to this direction or these two directions. Such two-dimensional movement, running for example in the plane of a cylinder lateral surface, can take place as the superimposed movement of two movements, running at right angles to each other, of the sealing device in an oblique path; it can also consist of a first movement and a subsequent second movement angled through 90°.

A further advantage of the configuration according to the invention consists in the minimizing of the working region in no longer just one dimension but rather now two dimensions along the outside of the hollow body which is to be maintained and is not part of the maintenance device. Instead of increasing the size of the working region, which is then to be sealed again, for lateral movement of the functional unit relative to the sealing device, the sealing device is jointly moved and the working region remains the same size. In particular in a hollow body which has already been opened and in which fluids continue to be transported, the flow in the hollow body is influenced only to a minimal extent. The working region can be kept small.

The adapter of the sealing device according to the invention can for example be screwed or welded onto a conduit. For this purpose, it can have on its underside additional sealing means such as for example rubber seals which support or cause a sealing fit relative to the conduit.

In a development of the invention, the adapter is a profile body which can be attached to the conduit, is adapted on its inside facing the conduit substantially to the outer circumference of the conduit and is configured predominantly in the form of a shell or clamp, i.e. its thickness is small, in particular in the region between the sealing device and a conduit to be maintained, compared to its planar extension along the sealing device or the conduit. This is particularly advantageous in order to keep the working region, the size of which increases as the thickness of the adapter increases, as flat and thus small as possible. The shape of the adapter can be adapted to the shape of the hollow body both on the inside of the adapter and on the outside of the adapter.

Particularly preferred is therefore a maintenance device for a hollow body which is configured as a pipeline and in which both the movable parts of the sealing device and the adapter are configured as shell-shaped or cylindrical surface elements. The sealing device can in this case, for the purpose of improved mountability on a conduit, be composed of a plurality of parts in a direction transverse to the longitudinal extension and/or in the direction of the longitudinal extension of the hollow body.

Also advantageous is a maintenance device in which the sealing device is substantially shell-shaped or hollow cylindrical in its configuration. In addition to the above-described advantages with regard to the minor influencing of a conduit which is in operation, a maintenance access of this type requires little overall space. The maintenance device, which is in many cases to be attached to earth-laid pipelines, is, with a sealing device which is made up of one or more sliding shells or comprises at least one sliding shell, small and inconspicuous. The term "sliding shell" refers in this case to parts of the sealing device that extend in a predominantly planar manner in the longitudinal or circumferential direction of the pipeline to be maintained, although peripheral hollow cylindrical profiles, such as for example clamps which are rather more flat in their configuration, can also be referred to as a sliding shell. The term "shell-shaped" accordingly denotes curved surfaces of profile bodies, the extension of which at least in a direction along the surface of the line is larger—preferably much larger—than their thickness. The term "sliding shell" thus denotes a profile body which can be moved with a curved surface along and/or in an extreme case directly on the outside of the hollow body or the adapter.

Preferably, the surface of the adapter that points away from the conduit is therefore also configured as a slide surface in order to provide, together with the further parts of the sealing device, a maintenance device which is as flat as possible and if appropriate to be able to dispense with further sealing means.

The maintenance device according to the invention is furthermore improved if the functional unit comprises a cutting device which is configured to form a cut or another opening in the hollow body.

Depending on the type of movement of the sealing device and of the cutting device, an opening is produced, for example, by milling a contour. In this case, the cut-out area is then removed from the conduit. Alternatively or additionally, an opening can be produced by removing adjacent areas by milling. In this case, only the metal shavings have to be removed from the line, for example by a filter or a magnet.

The forming of an opening in the hollow body by way of the movement of the sealing device, in particular in the embodiment as a sliding shell sliding via the conduit upper side or a surface of the adapter, also leads again to a small working region size and thus to a flow in the pipeline that is influenced only slightly. The cutting device, which is substantially immovable relative to the sealing device in the direction of the planar extension of the sealing device or the outside of the hollow body, is guided by the sealing device in the working region, as a result of which drive means for the cutting device do not have to be arranged, for movement in the surface, in the region which can be accessed by the fluid. On the contrary, the movement of the cutting device in the surface of the outer wall of the conduit requires merely drive means which are to be provided in accordance with the invention for movement of the sealing device and improve, for example, the manual movement, which is facilitated via one or more handles, of the sliding shell. Alternatively, the cutting device can of course be replaced by or supplemented with other devices such as for example measuring units. The cutting-out of any desired, and not just circular or linear, cuts in the conduit allows the production of adaptable maintenance accesses while the conduit at the same time continues to operate. Depending on the embodiment of an adapter which may be present, said adapter can, during cutting into or milling into the conduit, also be cut into and partly removed.

A maintenance device according to the invention is advantageously developed if the adapter is configured in a plurality of parts in a direction transverse to the longitudinal direction and/or in the direction of the longitudinal extension of the hollow body. A multipart recess of this type extends, in particular by way of two shell-shaped and/or annular segments which are configured for attachment to a conduit and arranged set axially apart from the conduit, the range of use of the device according to the invention owing to greater adaptability.

Advantageously, the working region of the maintenance device can be at least partly formed by at least one recess in the adapter. The region, through which for example parts of a cutting device can reach, can be adapted, as a result of the shape of the adapter, precisely to the maintenance action to be carried out; this can reduce the size of the region to be sealed and make the maintenance device and maintenance itself safer.

According to the invention, it can also be advantageous to configure the sealing device in a plurality of parts with regard to the elements sealing the working region. The sealing device then has a plurality of sliding shell elements which, by way of movement with one another and/or independently of one another, can guide the functional unit(s). At the same time, the individual parts of the sealing device can, by moving apart from one another, release the maintenance opening which is created or already present. Accordingly, it is advantageous if the maintenance device is developed in such a way that the individual parts of the sealing device can be moved, in particular independently of one another, at least in two directions, standing transversely to each other, along the outside of the hollow body to be maintained. Alternatively, the individual parts of the sealing device can however also be coupled to one another in such a way that the movements of the further part or parts are coupled to one another, for example in the manner of an iris diaphragm, or the movement of a part causes any further elements also to be moved.

The term "movement" refers in this case preferably to a movement in the direction of the planar extension of the slide surfaces or the outside of the conduit. Also conceivable are however movements of the sealing device in a direction perpendicular to the movement in the plane, for example in order to transfer a cutting device in contact with the conduit wall.

In the case of a multipart maintenance device, the parts of the sealing device are advantageously also provided with at least two mutually facing and in particular sealing-optimized connection sides, for example in the form of flanges, in order to be secured against one another so as to produce a particularly effective seal.

According to a further advantageous development of the maintenance device according to the invention, the extension of the adapter in the direction along the hollow body extends beyond the extension of the further parts of the sealing device. The sealing device can thus be driven via drive means which can be arranged, viewed in the longitudinal direction of the maintenance device, between the sealing device and adapter. In the case of an adapter which is for example welded to the conduit or pipeline, the sliding shells can for example be supported on said adapter. A dimension by which the adapter extends beyond the sliding shells, which are in a closed position, corresponds preferably to an extension of the opening in this direction of extension. The adapter can thus also adequately provide slide surfaces in order to release the opening.

Preferably, the maintenance device has at least one magnet holder. For example, parts of the conduit to be cut out or metal chips can be prevented from falling into the conduit. Preferably, the magnet holder is part of the sealing device in order accordingly to be able to be moved jointly.

For maintenance in which the conduit has to be completely severed, it can be advantageous if the maintenance device has a frame extending along the sealing device for stabilizing the hollow body. Said frame can be fastened directly to the adapter or be configured in such a way that it can be attached, in addition to the adapter or the sealing device, to the conduit.

The actuation and monitoring of the device according to the invention is furthermore improved if the maintenance device comprises sensors for detecting the position of the sealing device, which sensors can furthermore advantageously be interrogated, in particular remotely, via corresponding communication means and the information from which can be displayed via associated display means.

The foregoing object is furthermore achieved, in particular using an above-described maintenance device, by a method for maintaining an elongated, tubular hollow body of the aforementioned kind, which method is distinguished in that the underside of the sealing device, which seals the working region in a sealing position, is adapted in terms of shape to the curvature of the hollow body and the working region is released, viewed from a side of the sealing device that is remote from the hollow body, by displacing at least a curved part of the sealing device along the hollow body in order in particular to be able to introduce a maintenance tool into this hollow body and release it therefrom. The adaptation of the underside of the sealing device reduces the size of the working region and influences the flow less. In particular shell-shaped elements, which are adapted to the curvature of the conduit, of the sealing device take up less space. The term "adaptation" refers in this case to a curvature of the underside that follows the curvature of the hollow body. At the same time, the curvatures do not have to run parallel. The side of the sealing device that faces the hollow body can have a different radius of curvature to that of the outer wall of the hollow body.

Particularly preferably, the opening is made accessible by moving apart individual parts of a multipart sealing device, so that the conduit can be accessed from the centre of the opening and/or the type of opening can be controlled more variably.

Also advantageous is a method according to the invention which is further distinguished in that, for forming an opening, a functional unit, which comprises a cutting tool acting on a wall of the hollow body, can be moved, by way of a movement of the sealing device based on the surface of the hollow body, both in a first direction and transversely to this direction and in this case cuts into a wall of the hollow body, the working region being further sealed from the environment.

This method allows the maintenance of a pipeline, in particular the opening of the conduit wall during ongoing operation, to be made more convenient, as the working region required for cutting into the device remains small, even in the event of complete severing of a conduit during ongoing operation, and the influence on the flow can, as described hereinbefore, be kept as low as possible.

Accordingly, it is advantageous that the cutting tool be movable, for forming an opening in the hollow body via the sealing device, both in the longitudinal direction of said tool and transversely to this direction and as a result performs, in the case of a sealing device configured at a corresponding curvature as a sliding shell, a movement on a cylinder lateral surface.

According to a further method step according to the invention, it can prove advantageous to carry out the movement of the cutting device successively first in one direction and then in a direction transversely to the first direction.

The method according to the invention is furthermore improved if the same cutting device forms, by moving the sealing device in the same working region without repositioning any adapter to be provided, in the conduit wall a plurality of discrete openings or openings later to be combined. This can be beneficial for example for simultaneously introducing a plurality of maintenance or measuring instruments.

The method according to the invention is also further improved if the maintenance tool is not only slid into the line but rather introduced into the pipeline via an insert which is moved in said pipeline. In this case, it is particularly advantageous if the insert guides the maintenance tool out of a direction which is angled relative to the longitudinal extension of the hollow body, in the direction of the longitudinal extension of said hollow body.

Furthermore, it can be advantageous if the maintenance tool is introduced into the conduit via a multiple, preferably dual deflection. In the case of such guidance, the maintenance tool can be introduced into the hollow body from a large number of positions relative to said hollow body.

An above-described device or a device described with reference to the figures comprising a displaceable insert can, as described hereinbefore, also be advantageous over the prior art without a sealing device having a curved underside. The same applies to a method according to the invention, the use of the insert providing the advantages over the prior art that significantly improve the introduction of maintenance tools into tubular hollow bodies and are advantageous in particular for tools to be inserted into the conduit such as cleaning pigs. For this purpose, the inserts, which can be inserted at least partly into the hollow body, form a guide via which the cleaning device is directed at least partly in the longitudinal direction of the conduit.

Furthermore, one embodiment of the invention is advantageous, in which the maintenance device has an insert which can be pivoted about an axis which is transverse with respect to the longitudinal axis of the conduit. The housing preferably has a cylindrical design around the insert, in order to provide only the space which is required for pivoting of the insert.

In a further advantageous refinement of the invention, in particular without an adapter, the housing is configured directly for fastening on the hollow body, which can increase the safety of the maintenance device. A type of fixing on the conduit takes place by welding.

In the case of fixing directly on the conduit, fastening flanges are preferably used, which are arranged such that they are oriented in the circumferential direction, that is to say about a conduit to be machined on the actual housing of the maintenance device and in the longitudinal direction of the hollow body. With a minimization of the movable parts to be used, this type of fastening makes secure fixing on the conduit possible.

The sealing device according to claim 37 is advantageously constructed from at least four shell-shaped elements which can be introduced into the housing successively through an opening of the latter, when the said housing is situated in a fastening position on a conduit. Here, the length of the sealing device which extends in the direction of the longitudinal extent is configured in such a way that, in a sealing position, a sealing action of the work region is brought about firstly via the housing and secondly via the sealing device which delimits the conduit in the circumferential direction. A reliable sealing action of an open conduit is brought about by the use of a sealing device which encloses the conduit completely and has, in particular, at least one seal which acts on its circumferential side. Whereas the sealing device has a sealing face or seal against the housing at one end on its outer circumferential side, the sealing device can have an end-side sealing plane which preferably extends transversely with respect to the said outer circumferential side and is configured for bearing against a side wall of the housing. As can be gathered from the following description of the figures, the sealing device is mounted displaceably in the housing here in such a way that the smallest space requirements are made. In particular in a position which is situated in a receptacle of the housing, the said end-side sealing plane can seal the work region and the open conduit with respect to the surroundings and/or the rest of the housing.

In the above-described embodiment and in general, the sealing device can preferably be moved by a ram which can be guided through the housing.

The elements which exert a drive force can therefore be arranged outside the housing and in a readily accessible region for maintenance or monitoring purposes. Here, the ram preferably extends in the longitudinal direction of the conduit to be maintained, with the result that the sealing device can also be displaced in this direction.

A flange which forms a sealing seat and fixes the seal can be arranged, in particular, on one or more of the shells. Furthermore, the said flange can preferably have a receptacle for arranging the ram and is situated at one end of the sealing device, with the result that large parts of the sealing device can be used directly for sealing.

In order to assume an optimum sealing position, the housing can have at least one guiding face which ensures a proper sealing seat of a sealing device which can be introduced via the guiding face into a receptacle or a defined housing region, for assuming a closed position. The said guiding face is, in particular, part of a receptacle, in which the sealing device is arranged in its sealing position.

Milling out of a part of the conduit to be maintained can preferably be performed via a milling device having at least two milling tools, for example in the form of milling heads, which, in particular, are arranged at least partly next to one another and can be operated at the same time. A conduit can be opened more rapidly via the simultaneous use of a plurality of milling tools. A horizontal movability of an individual milling head can be brought about by simultaneous pivoting of the milling heads about a central axis of the milling device.

BRIEF DESCRIPTION OF THE DRAWINGS

Further advantages and details of the invention can be inferred from the subsequent description of the figures, in which.

Figure 1:
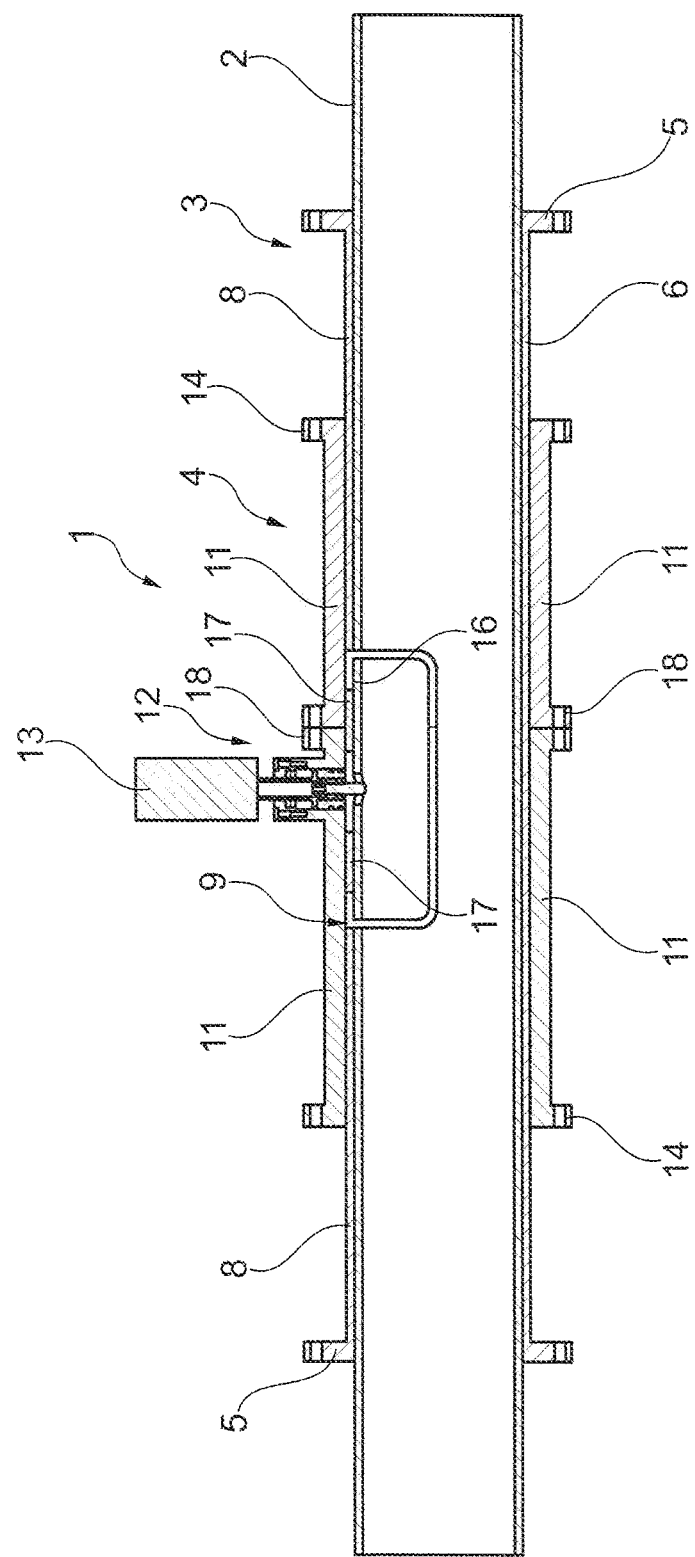
FIG. 1 is a schematic longitudinal section of a subject-matter according to the invention.

Parts which act identically or similarly are—if appropriate—provided with identical reference numerals. Individual technical features of the exemplary embodiments described hereinafter can also lead, with the features of the exemplary embodiments described hereinbefore, to developments according to the invention.

DESCRIPTION OF PREFERRED EMBODIMENTS

FIG. 1 shows a maintenance device 1 according to the invention which is already arranged on a hollow body 2 not pertaining to the invention in the form of a conduit/pipeline. The maintenance device 1 comprises a multipart adapter 3 with outer fastening flanges 5 as part of a correspondingly multipart sealing device 4.

Figure 2:
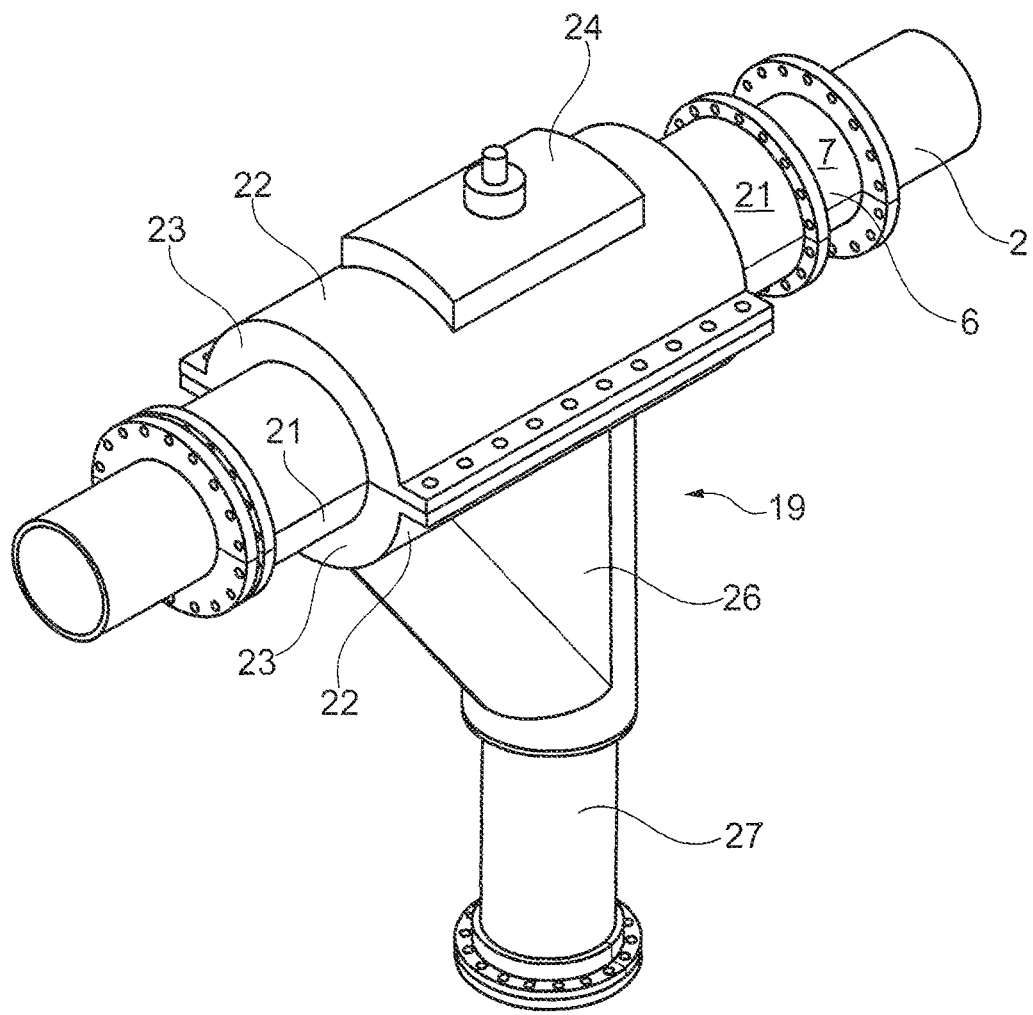
FIG. 2 is a schematic view of a further subject-matter according to the invention.
Figure 3:
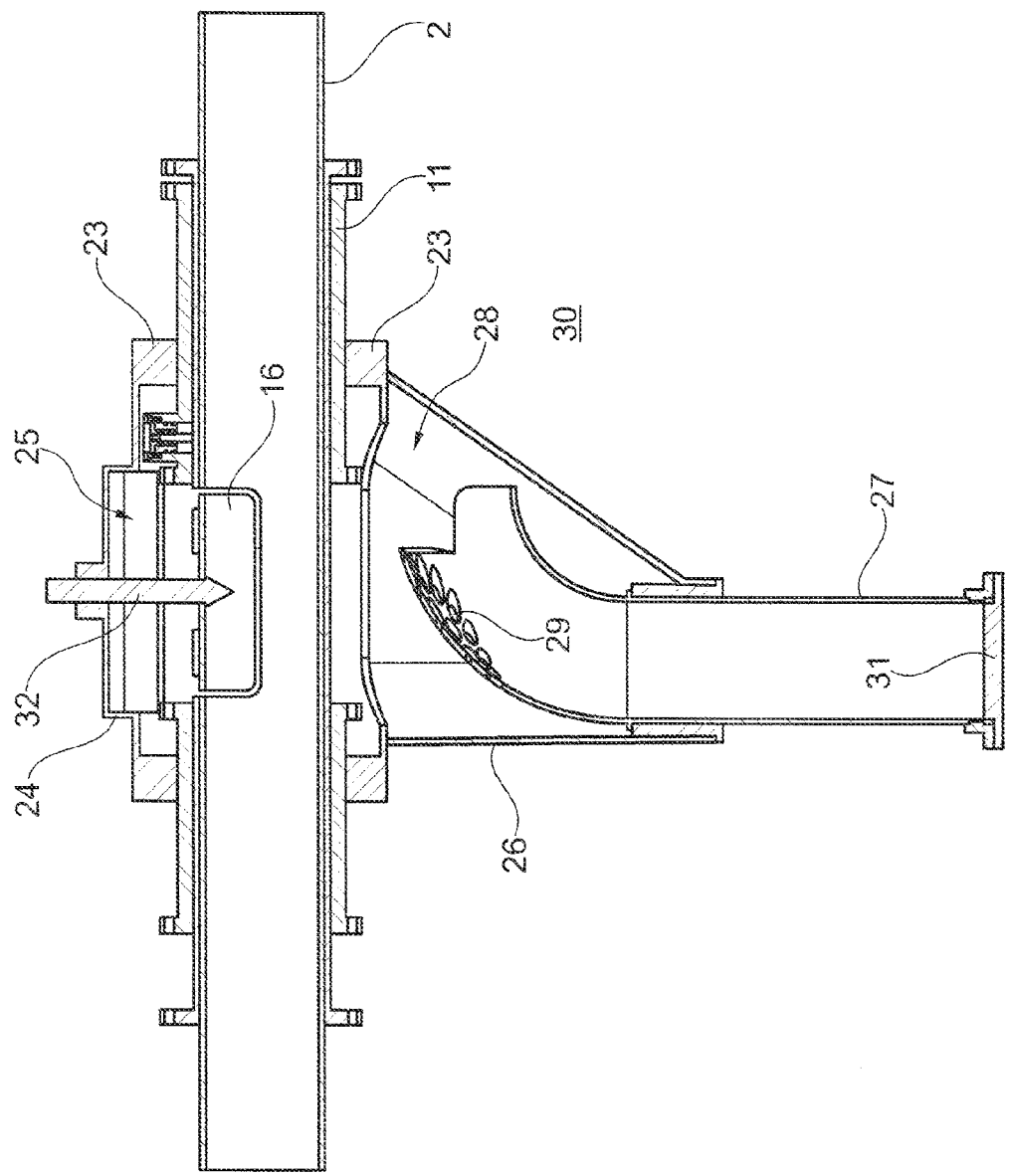
FIG. 3 is a schematic longitudinal section of the subject-matter according to FIG. 2.
Figure 4:
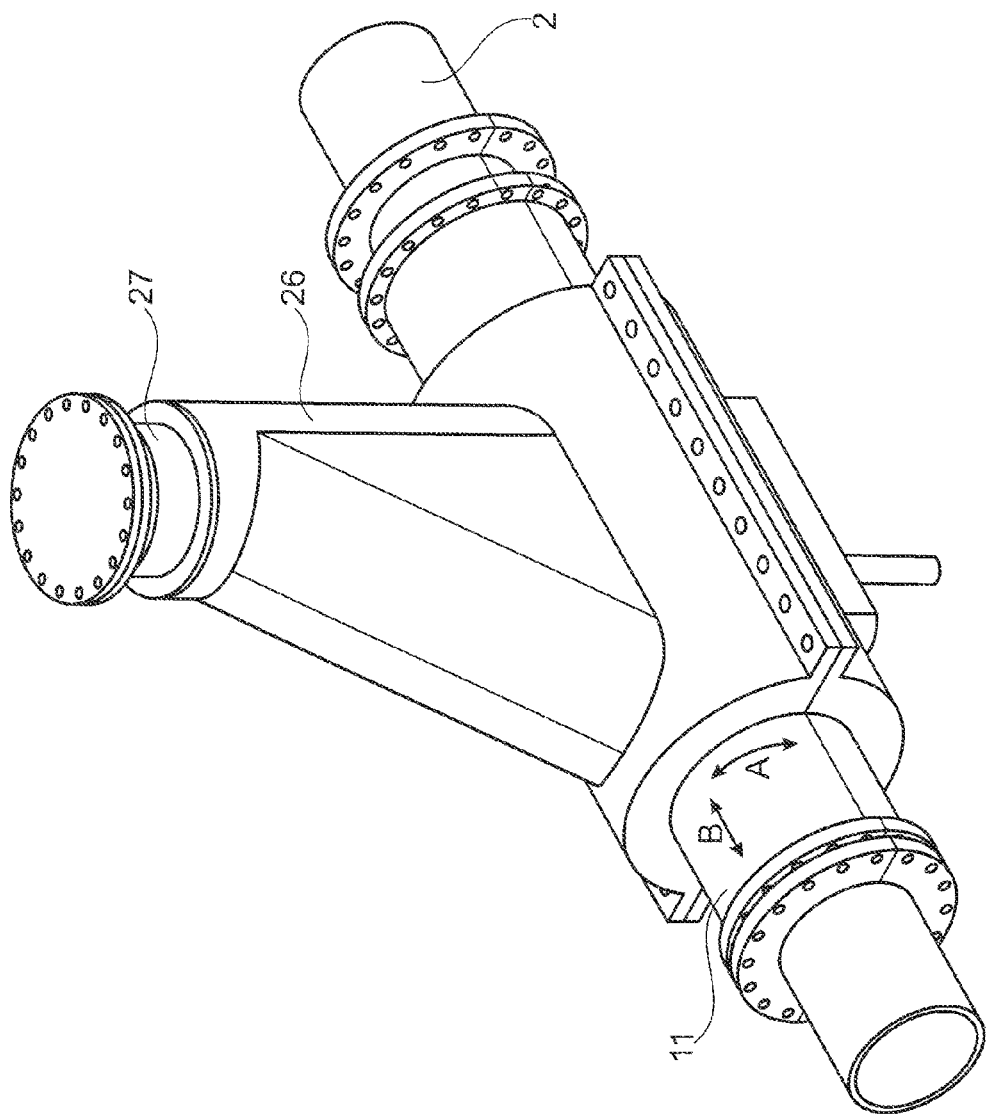
FIG. 4 is a schematic view of the subject-matter according to FIG. 2 in a different operating position.

The adapter 3 comprises a part 6 which is the lower part in FIG. 1 in the manner of a hollow half-cylinder (cf. FIG. 2). This part is adapted in terms of shape to the conduit 2 to be maintained and fastened thereto. The surface 7 of the adapter 3 that points away from the conduit 2 is configured as a slide surface for further parts of the sealing device 4. In the exemplary embodiment shown, the conduit 2 is completely surrounded.

The adapter 3 has two upper parts 8 arranged at a distance from each other, whereas the lower part 6 is made of one piece. Together, the part 6 and the parts 8 form a working region 9 which can be sealed by the sealing device 4 from the environment and is sealed in FIG. 1.

The sealing device 4 itself further comprises four sliding shells 11 which are substantially configured, in terms of their shape, as half-hollow cylinders and can slide with their inside via the surface 7. If appropriate, sealing means can be arranged between the two slide surfaces, i.e. the underside of the sliding shells 11 and the surface 7 which is to be assigned to the parts 6 and 8, to improve the sealing of the working region.

As a functional unit 12, the sealing device 4 comprises a cutting device with a motor, for example formed as hydraulic or electric motor, which is arranged in a housing 13. The functional unit 12 can be moved via the sealing device 4. FIG. 1 shows how the cutting device was guided by the sealing device 4 to produce an opening in the tubular wall.

The four shell-shaped parts 11 of the sealing device 4 are provided on their outside also with fastening flanges 14. Drive means can for example be arranged between the flanges 5 and 14 for moving the sealing device.

As may be seen, the working region 9 is kept very small, as a result of which the conduit cross section remains almost unaltered even after a possible removal of the cut-out wall part 16. The wall part 16 is prevented by the magnet holder 17 from falling into the conduit 2.

The two parts, shown on the left and right-hand sides in the figure, of the sealing device 4 can be fixed to each other via fastening flanges 18. For secure fixing once maintenance has been carried out, the two hollow cylinders can for example be screwed to each other via the flanges 18.

The development shown in FIG. 2 of the maintenance device according to the invention as shown in FIG. 1 further comprises a housing 19 which is attached to the outside pointing away from the conduit 2. The housing 19 can also be moved via drive means (not shown in greater detail) on the outside 21, which is configured as a slide surface, of the sealing device 4. The housing can therefore be moved, just like the sealing device 4, around and along the conduit 2 relative to the adapter 3 which is fastened to the conduit 2.

The housing comprises two parts 22 which rest with their sides 23 tight against the outside 21 and form at least one chamber in which a cleaning pig or other maintenance tools can be stored. In the case of the subject-matter according to FIG. 2, the upper part 22 as shown in FIG. 2 comprises a housing portion 24 which jointly forms a first chamber 25. The lower part 22 has a relatively large profile body 26 forming together with an insert 27 a further chamber 28. The chambers 25 and 28 can be sealed from the environment 30 of the maintenance device. The chamber 28 is reached via an access which can be closed by a lid 31.

Figure 5:
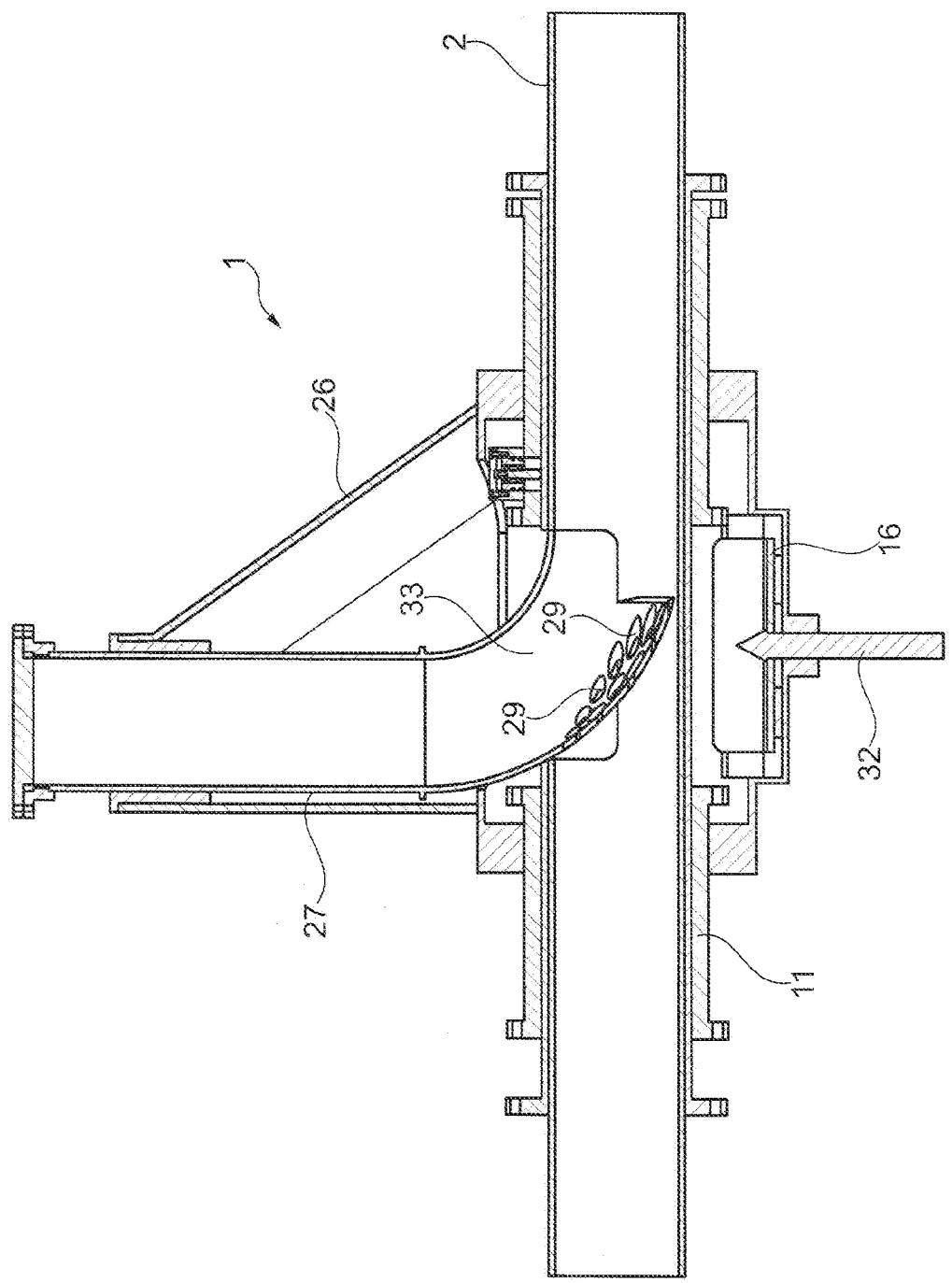
FIG. 5 is a schematic longitudinal section of the subject-matter according to FIG. 4.

The housing portions 22 are located on opposing sides with regard to the conduit. The associated chambers 25 and 28 and the maintenance tools located therein are brought into the region of the conduit opening by rotating or swivelling the housing 19. For example, a punch 32, which is provided with an arrow-shaped tip and mounted in the housing portion 24, can serve to secure and remove the wall parts 16 to be removed. According to the invention, other maintenance tools, such as for example measuring means, can also be stored in the housing and/or provided as a functional unit. For this purpose, a hole is cut into the wall part 16 via the cutting device. The part 16 is fixed by moving the sliding shells 11 of the sealing device 4 apart from one another and introducing the tip into the working region and into the wall part 16. Subsequently, the cutting device can cut the entire wall part 16 out of the conduit 2, whereupon said wall part is, as shown in FIG. 5, brought into the chamber 25 by extracting the punch 32 and thus can be removed from the conduit 2. A comparison of the figures clearly reveals that the cutting device can cut wall parts 16 having any desired contours out of the conduit 2.

For introducing the insert 27 into the conduit 2, the housing is rotated through 180° into the position shown in FIG. 5 and the insert is guided into the conduit through the opening and the working region. If appropriate, the sealing device 4 may in the meantime have sealed the conduit 2 again by drawing it together in order to keep the influence on the flow in the pipeline as low as possible.

Once the housing portion 26 has been brought into position and the sealing device 4 opened again if appropriate, the curved end 33, which is the lower end in FIG. 5, is brought into the conduit. The end 33 serves as a guide and is curved to the extent that a maintenance tool (not shown) located in the insert 27 is guided into the line.

The end 33 has a cross section corresponding substantially to the conduit cross section. For introducing the insert 27, up to half the conduit 2 has for this purpose been opened. Owing to the curvature, the insert wall merges with the conduit wall or nestles against it.

During the introduction of the insert into the conduit 2, said conduit can continue to be operated. The chamber 28 is in this case sufficiently pressure-tight to prevent the fluid located in the line from escaping. Owing to throughflow openings 29 which are provided in the portion of the insert 27 that is to be introduced into the conduit 2, the flow is also influenced as little as possible in the position of the insert shown in FIG. 5. Instead of the throughflow openings, the arched end 33 of the insert 27 can for example consist of arched struts which influence the conduit cross section less.

Figure 6:
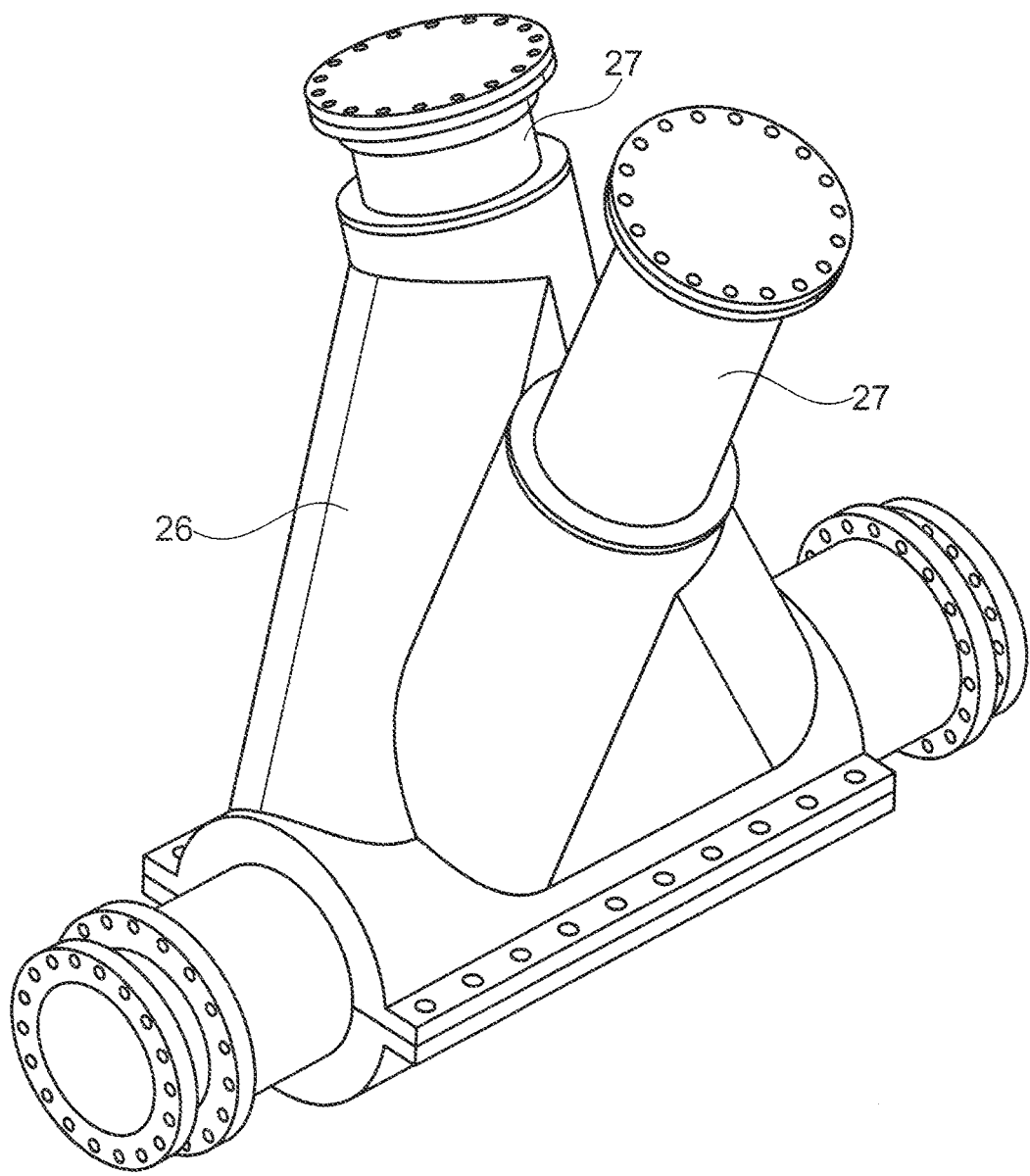
FIG. 6 is a schematic view of a further subject-matter according to the invention.
Figure 7:
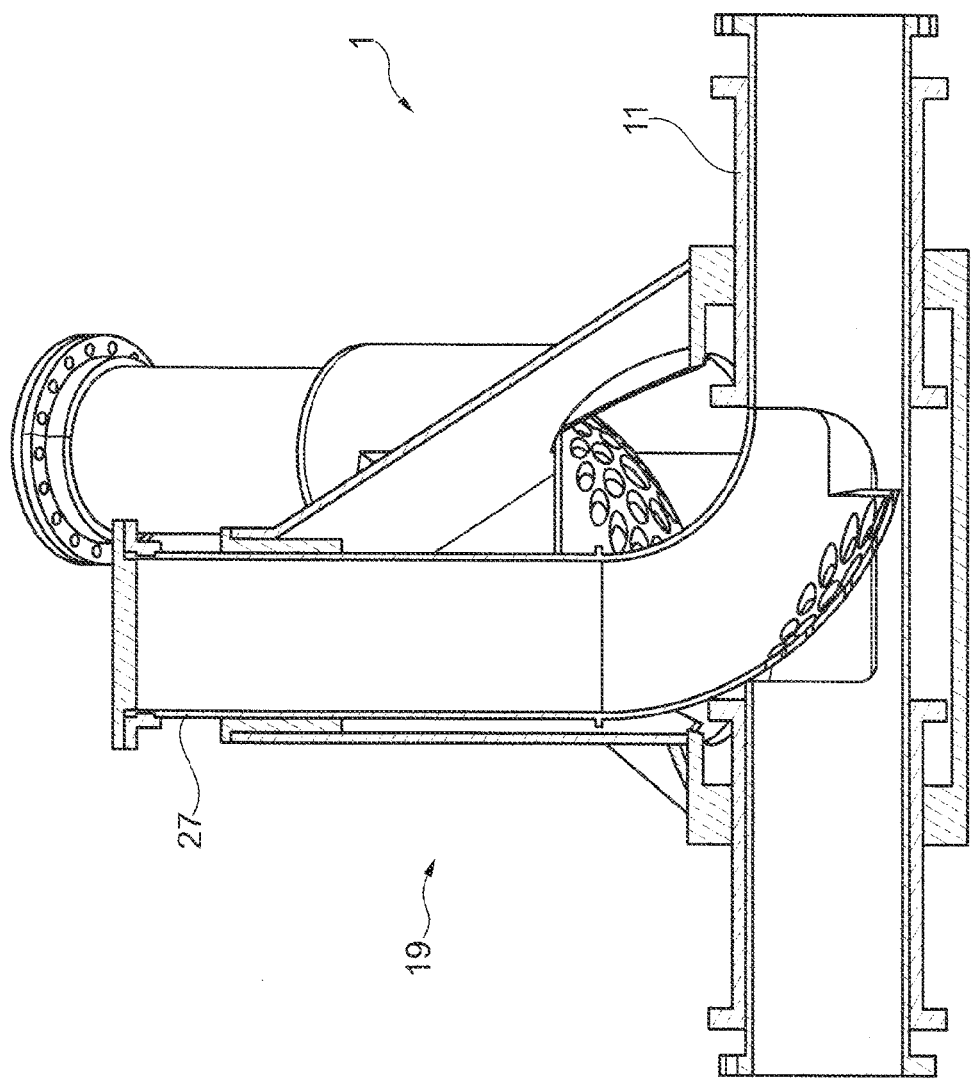
FIG. 7 is a schematic longitudinal section of the subject-matter according to FIG. 6.

The development of the invention shown in FIG. 6 comprises two inserts 27 which form tightly abutting chambers and have ends 33 pointing in differing conduit directions. A maintenance tool can thus be inserted in both conduit directions. For the successive introduction of the inserts 27 into the conduit 2, the housing 19 can be rotated accordingly. In addition, in the exemplary embodiment shown, a punch 32 according to FIG. 5 could be stored via a further housing portion.

A plurality of the devices shown are particularly suitable for being attached at intervals along a conduit 2 and for simplifying both removal and insertion of a maintenance tool maintaining the conduit 2. For times in which the conduit 2 is not maintained, said conduit is sealed by means of the sealing device 4 with its hollow cylinder half-shells 11 in a manner corresponding roughly to the original shape without a maintenance opening.

Figure 8:
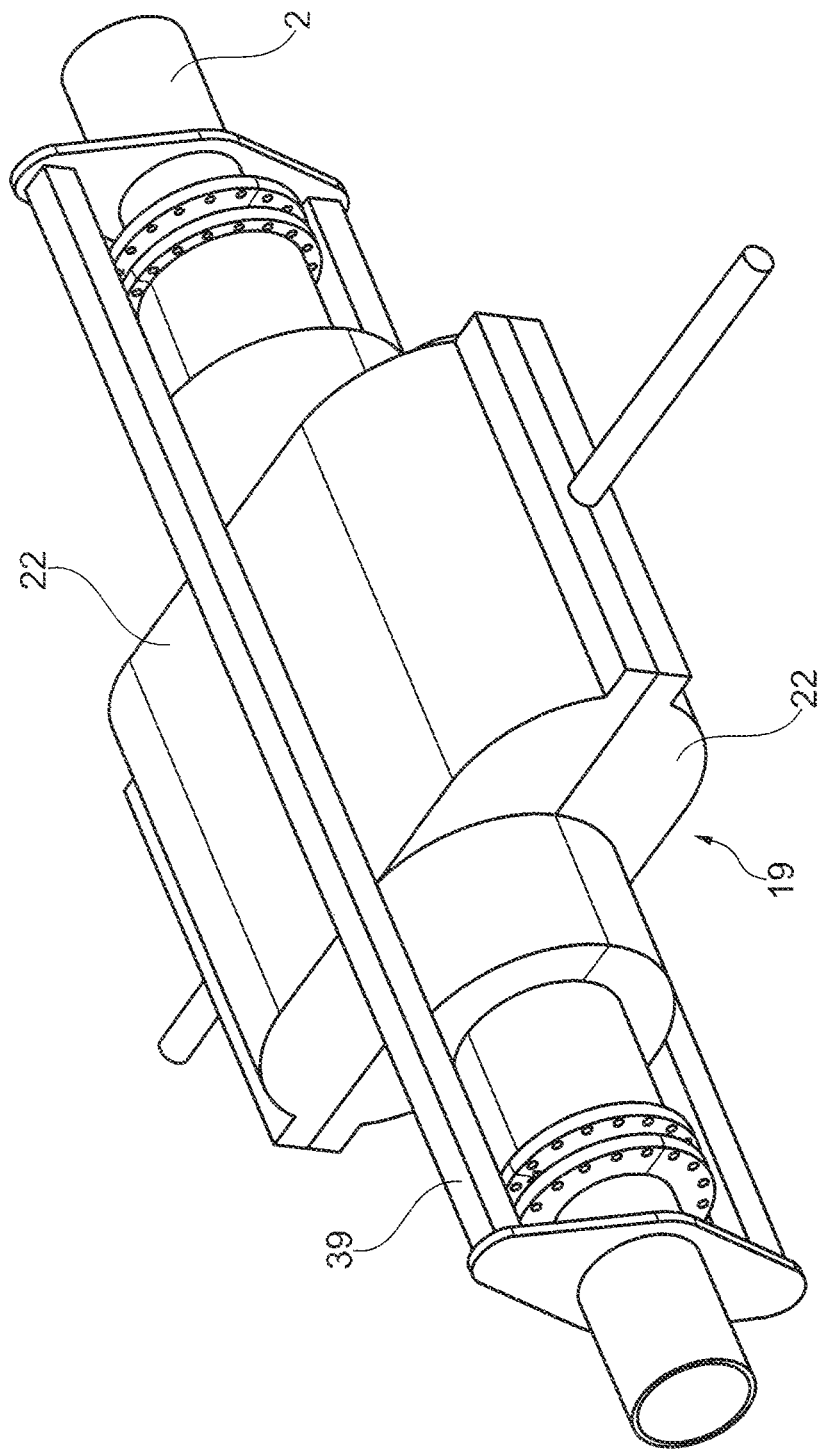
FIG. 8 is a schematic view of a further subject-matter according to the invention.
Figure 9:
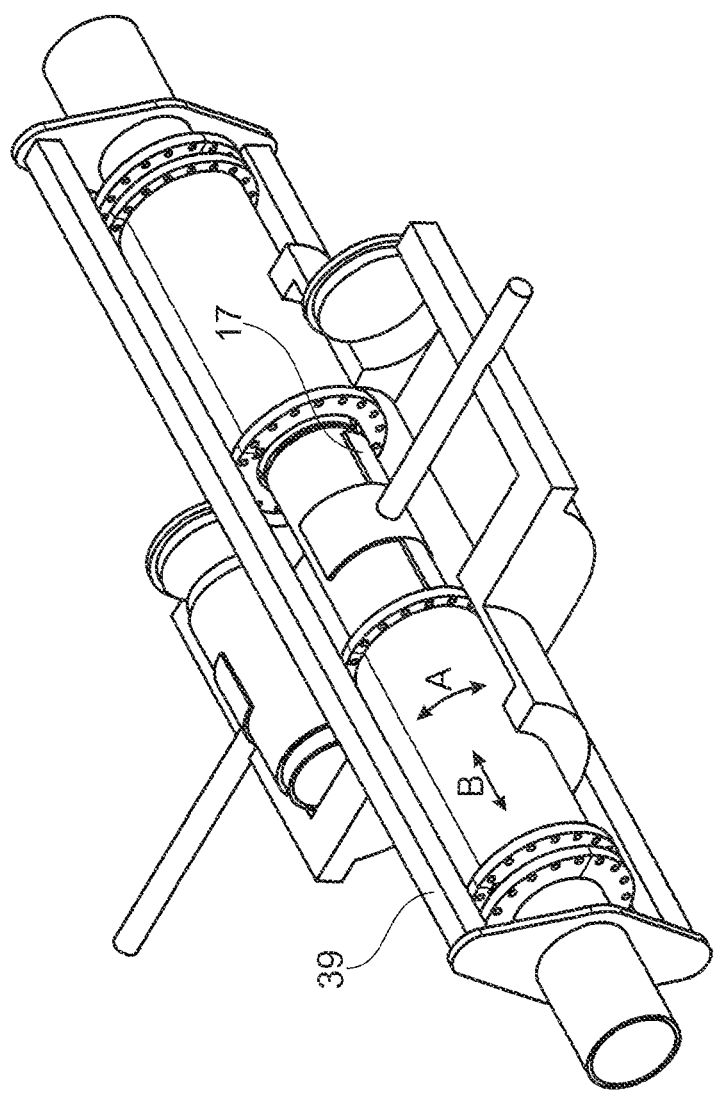
FIG. 9 is a schematic, perspective, partly exploded view of the subject-matter according to FIG. 8.

The maintenance device according to the invention as shown in FIG. 8 is particularly suitable during complete severing of a conduit 2. The housing 19 has again two opposing chambers 25 and 28. A first removal punch 34, which is displaceable transversely to the conduit 2 and mounted in the housing 19, can be attached to the wall part 16, which has been or is to be cut out, and can transfer said wall part out of the conduit into the chamber 28. Additional magnet holders 17 can be provided for this purpose (cf. FIG. 9). Once the conduit has been closed via the sealing device 4, the part 16 can then be removed via the gap 36.

An insertion punch 37 can be used to introduce an insert 38 into the conduit. The insert 38 can be an insert with a maintenance tool located therein, although it can also be a piece of new conduit 2 that can be inserted into the conduit 2 by means of a functional unit 12 configured as a welding system. The welding system could in this case be guided around the conduit 2 via the sealing device 4 and weld the conduit parts to one another. Alternatively, a maintenance tool can be introduced into the part 16 and said part can be reintroduced into the line 2 on the inverted path. The frame 39, which is shown in FIG. 8 and attached to the conduit, serves to stabilize the conduit 2.

Figure 10:
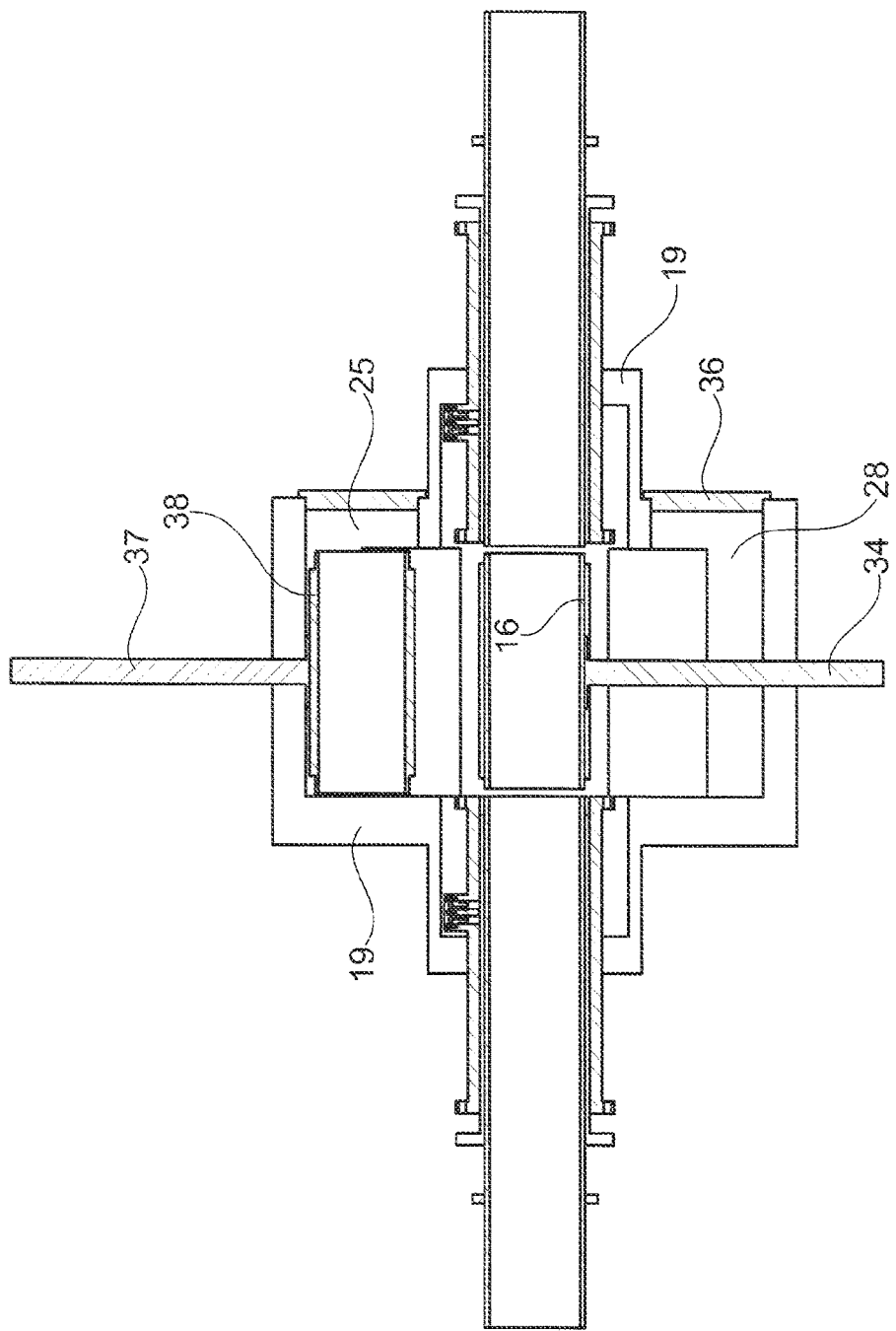
FIG. 10 is a schematic longitudinal section of the subject-matter according to FIG. 8.

Compared to the maintenance device according to FIG. 1, the embodiment shown in FIG. 10 is provided with two functional units 12 in the form of cutting devices. Once maintenance has been carried out, a part of the functional unit 12 can be removed, as is indicated by the motor housing part 13 missing in FIG. 10, and the housing can be dismantled, so that the maintenance device consists substantially only of the adapter 3, sealing device 4 and if appropriate a frame 39 for stabilizing.

Figure 11:
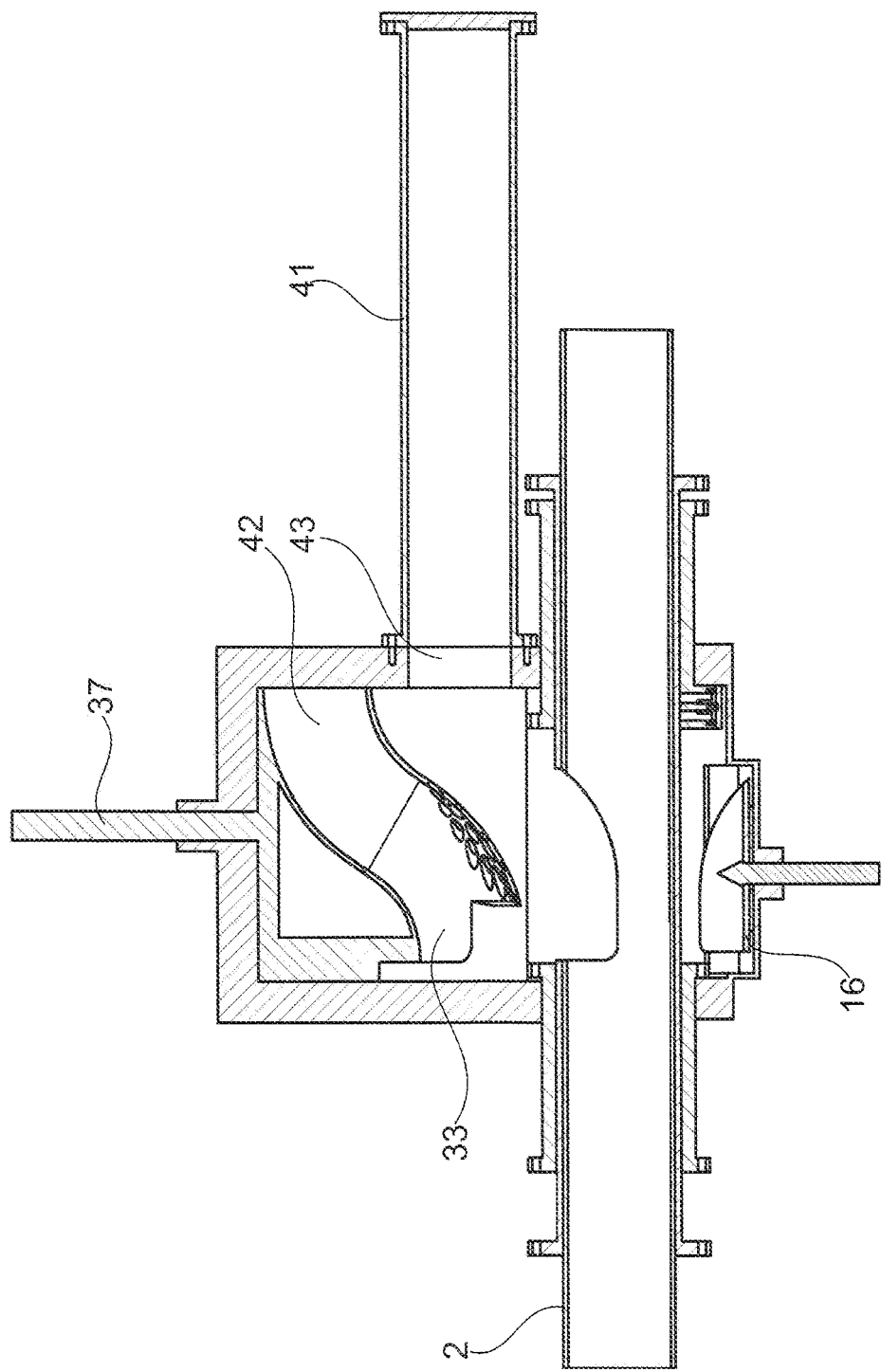
FIG. 11 is a schematic longitudinal section of the subject-matter according to FIG. 12.
Figure 12:
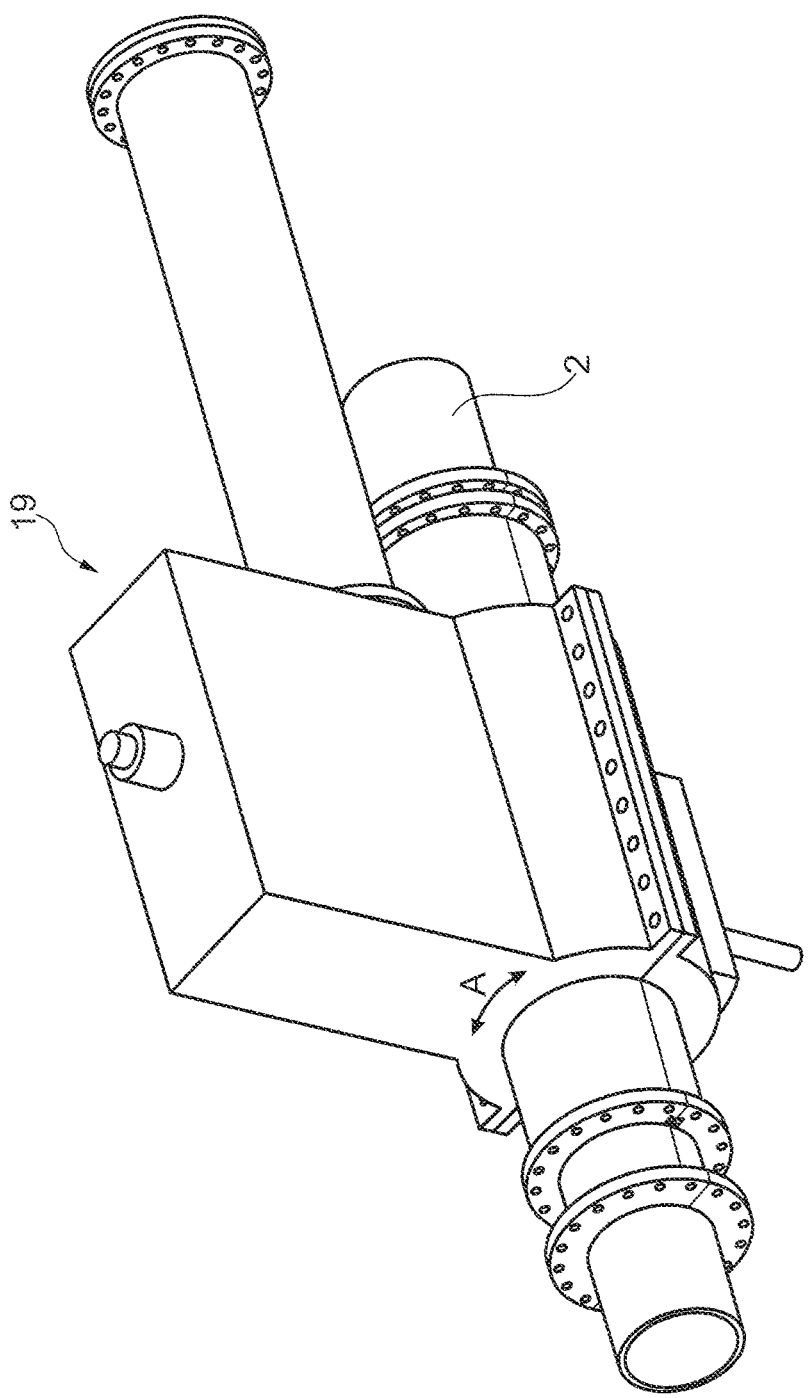
FIG. 12 is a schematic view of a further subject-matter according to the invention.

The further device 1 according to the invention shown in FIGS. 11 and 12 is suitable in particular for the insertion of relatively long maintenance tools. Such a maintenance tool can, in a non-use position, be stored in a tubular storage device 41 which can be attached to the housing. Once the conduit 2 has been cut into, the wall part 16 removed and the housing 19 rotated in order to bring the chamber 28 into contact with the opening, the insert 27, which forms an S-shaped guide, can be brought with its lower end 33 into the conduit 2 via an insertion punch 37. The upper end 42 is then positioned at an access opening 43 through which the maintenance tool can be brought into the conduit. By means of such single or double arched inserts, the maintenance device 1 according to the invention can be adapted to the respective prevailing spatial conditions and a maintenance tool can be guided into a conduit 2 from various positions relative to said conduit. The housing 19 acts in this case as an adapter housing.

The sealing device 4 and the housing 19 can each be moved in a direction A along the circumference of the conduit 2. A movement, which is also simultaneous or carried out at a different point in time, is also possible in direction B in the longitudinal direction of the adapter 3 or the conduit 2. This also applies to the opposing directions indicated by the double-headed arrows A, B.

Figure 13:
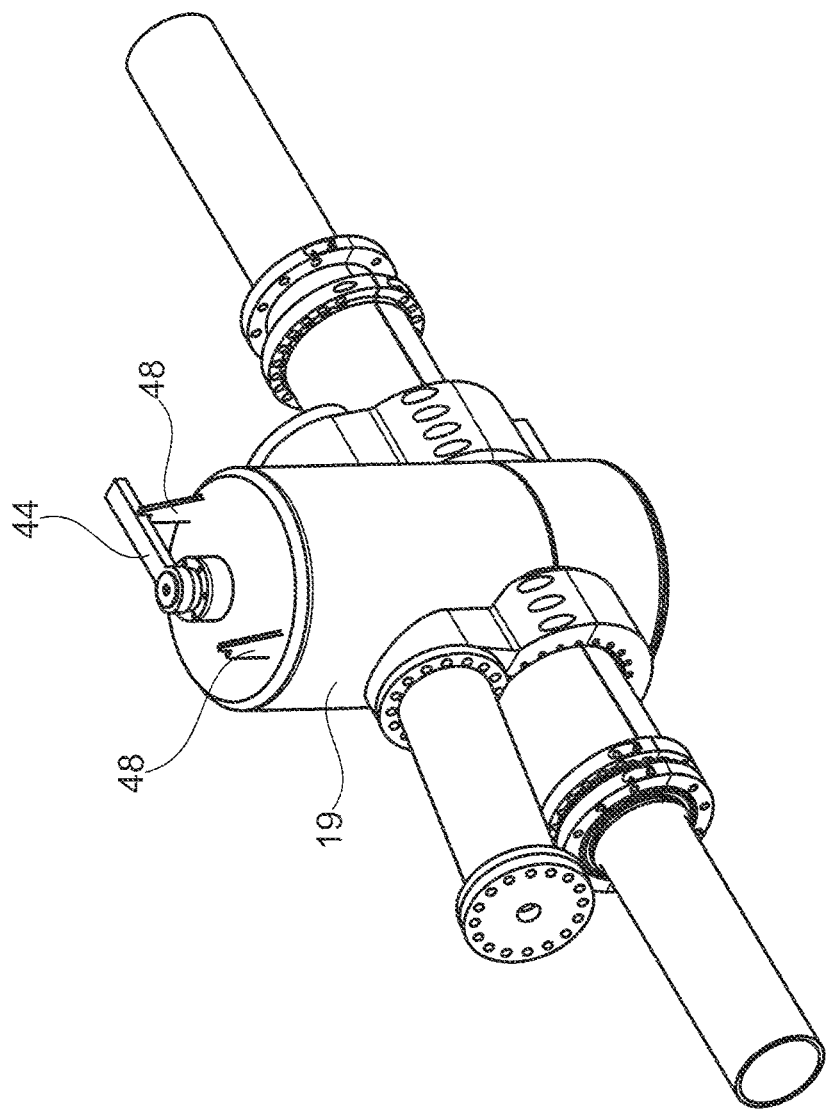
FIG. 13 is a schematic view of a further subject-matter according to the invention in a perspective view.
Figure 14:
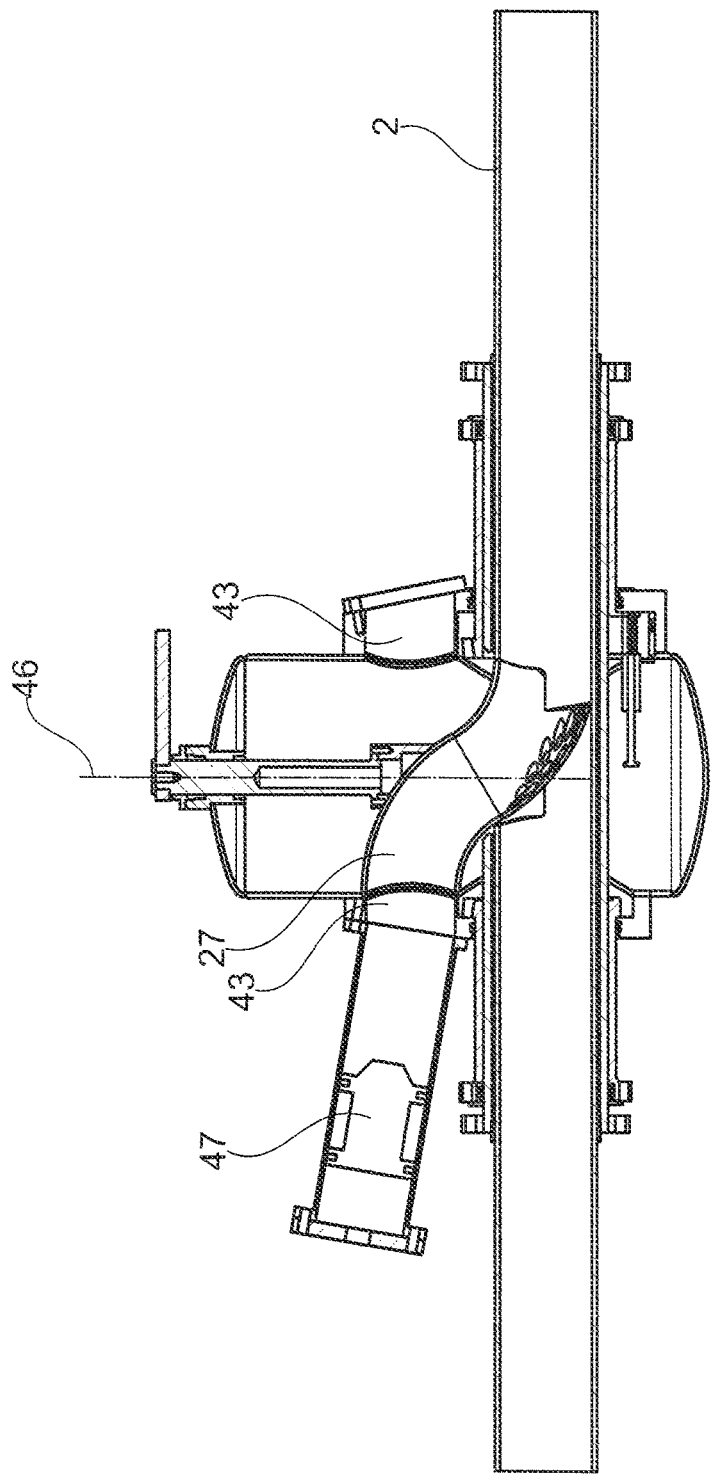
FIG. 14 shows schematically the subject-matter according to FIG. 13 in a longitudinal section.

According to the exemplary embodiment according to FIG. 13, the housing 19 is provided with a cylindrical cross section. A lever mechanism 44 serves to pivot the insert 27 shown in FIG. 14 about an axis 46, in order for it to be possible to insert an indicated maintenance tool 47, for example a cleaning pig, via access openings 43 into the pipeline 2 in both directions starting from the maintenance device, or to remove it from the pipeline coming from one of the two directions. Stops 48 can delimit the pivoting. The lever mechanism 44 is movable along the axis 46, in order to move the insert 27 into the conduit or out of the latter.

Figure 15:
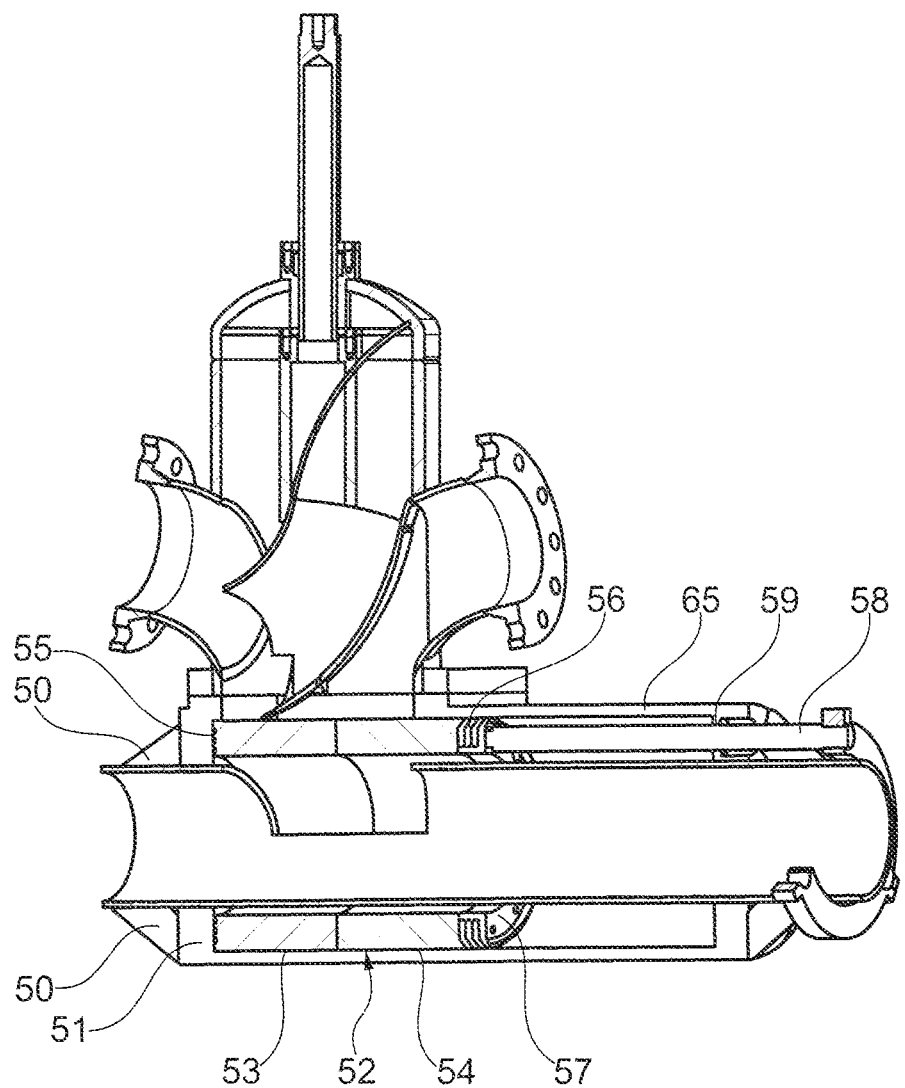
FIG. 15 shows schematically a further maintenance device according to the invention.

FIG. 15 shows a further subject-matter according to the invention, in which the housing is arranged in a sealing position moved over welds on the conduit, via fastening flanges 50 and directly on its end sides 51. In the figure, the sealing device 52 is situated in its closed position. Here, the sealing device, the main body of which is constructed from four shell elements, of which only two shell bodies 53 and 54 are shown, bears at one end against an end side 55 of the housing which is part of a receptacle. At the other end, the sealing device is sealed circumferentially with respect to the housing by means of seals 56. The latter are arranged in a flange 57 which at the same time also forms a receptacle for a ram 58. The latter reaches through the housing, a sealing action with respect to the surroundings being brought about by means of a seal 59. Further rams 58 (not shown) are arranged in the circumferential direction of the housing and the conduit.

Figure 16:
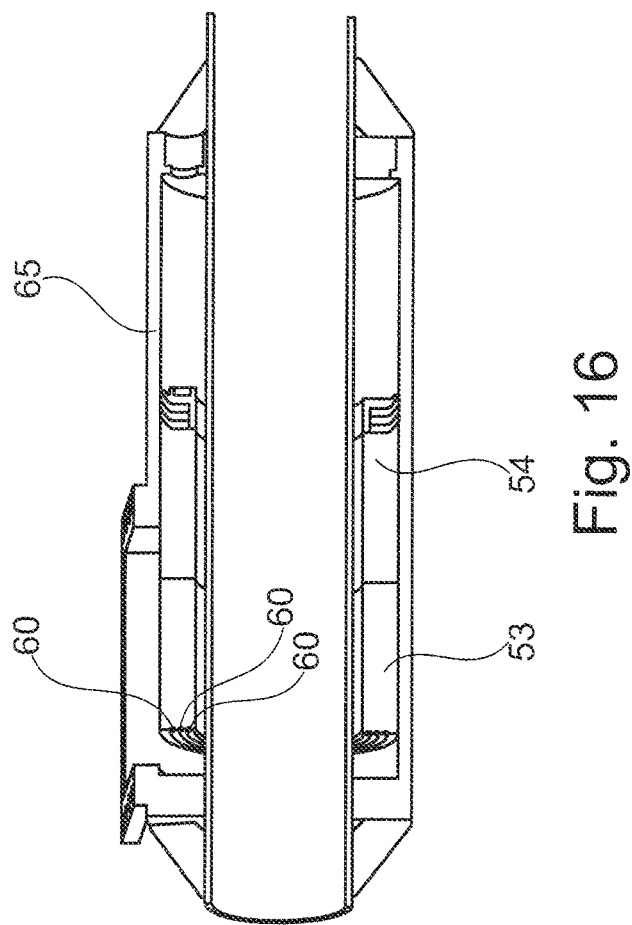
FIG. 16 shows schematically a detail according to the subject-matter according to FIG. 15.

That sealing face of the shell 53 which is in contact on the side 55 at the end has a total of three sealing rings 60 which extend in associated grooves of the sealing device (FIG. 16).

Figure 17:
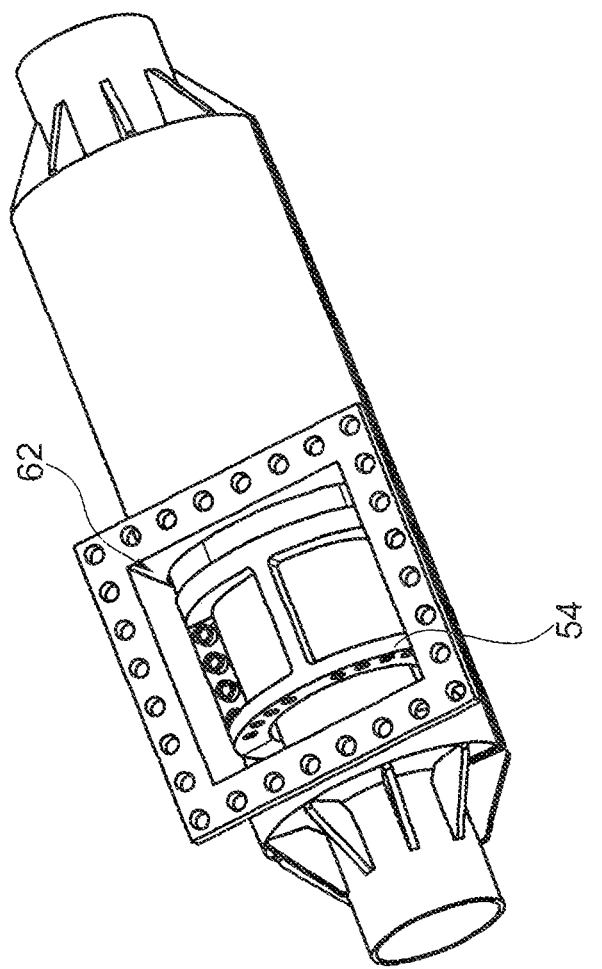
FIG. 17 shows schematically a further partial view of a subject-matter according to the invention according to FIG. 15.

It can be gathered from FIG. 17 that the sealing device can be inserted into the housing successively during the construction of the maintenance device, the overall length as viewed in the conduit direction being greater than the corresponding length of an opening 62 (likewise again viewed in the longitudinal direction of the conduit).

Figure 18:
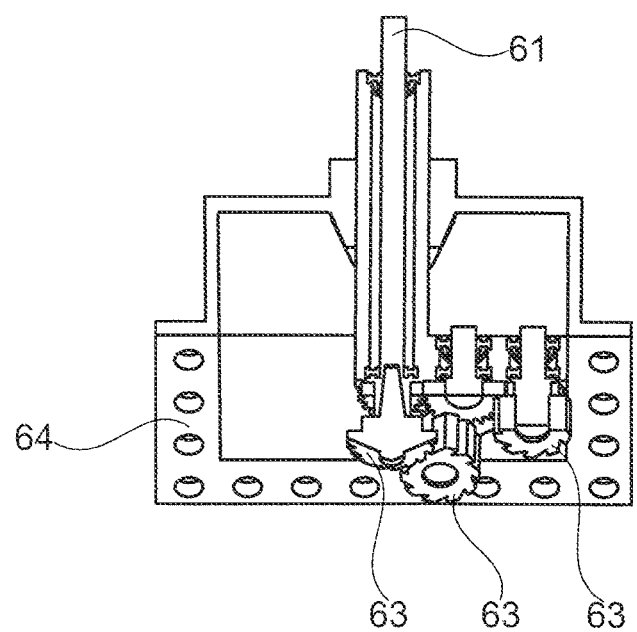
FIG. 18 shows schematically a detailed view of a further subject-matter according to the invention.

In the open position of the sealing device, milling out of a pipe wall region can be performed via a milling device (shown in FIG. 18) which can be connected to a housing part 65 of the maintenance device via a flange which closes the opening 62, an opening being produced via a rotation of the milling device or at least parts of the milling device which have dedicated milling heads 63. Here, the drive force is transmitted by a drive train 61 which encloses the central rotational axis via gearwheels to the further milling cutters 63 which are mounted at the end on the milling device.

What is claimed is:

1. Maintenance device for an elongated, tubular hollow body (2) which is configured for conducting a fluid, with a sealing device (4) which provides a sealing action for sealing a working region (9) from an environment (30) of the hollow body (2) and can be moved along the hollow body (2), wherein a side of the sealing device (4) that is to be turned toward the hollow body (2) forms an at least partly curved surface and can be moved along the hollow body (2), wherein the sealing device (4) comprises an adapter (3), wherein the adapter (3) is adapted to be attached to the hollow body (2) in a sealing manner, wherein the adapter (3) has a surface (7) facing away from the hollow body (2), wherein the adapter (3) forms the working region (9) allowing access to the hollow body (2), and wherein moveable parts of the sealing device (4) rest on the surface (7) of the adapter (3), wherein the moveable parts are adapted to move relative to the hollow body (2) in a first direction (A) and a second direction (B) extending transversely to the first direction (A) and are adapted to move across the working region (9) while maintaining said sealing action.

2. Maintenance device according to claim 1, wherein the sealing device (4) is substantially shell-shaped or hollow cylindrical in its configuration.

3. Maintenance device according to claim 1, wherein the maintenance device comprises as a functional unit (12) a cutting device which is configured for forming a cut in the hollow body (2) and is in particular part of the sealing device (4).

4. Maintenance device according to claim 1, wherein the surface (7) of the adapter (3) is configured as a slide surface.

5. Maintenance device according to claim 1, wherein the working region (9) is formed at least partly by at least one recess in the adapter (3).

6. Maintenance device according to claim 1, wherein the sealing device (4) is configured in a plurality of parts.

7. Maintenance device according to claim 1, comprising a frame (39) extending along the sealing device (4) for stabilizing the hollow body (2).

8. Maintenance device according to claim 1, comprising a housing (19) which is provided to form at least one chamber (25, 28) which can be separated from the working region (9) by means of the sealing device (4).

9. Maintenance device according to claim 8, wherein the housing (19) is arranged on the sealing device (4).

10. Maintenance device according to claim 8, wherein the housing (19) is movable relative to the sealing device (4).

11. Maintenance device according to claim 8, wherein the housing (19) is arranged on the adapter (3).

12. Maintenance device according to claim 8, wherein the housing (19) comprises a displaceable insert (27) which is configured for introducing a maintenance tool into the hollow body (2).

13. Maintenance device according to claim 12, wherein the insert (27) has a longitudinal extension running at least partly transversely to the hollow body (2), in such a way that a maintenance tool to be introduced into the insert (27) is angled in its longitudinal extension relative to the longitudinal extension of the hollow body (2).

14. Maintenance device according to claim 12, wherein the insert (27) is configured so as to be curved in its longitudinal direction.

15. Maintenance device according to claim 12, wherein the insert (27) has throughflow openings (29).

16. Maintenance device according to claim 12 with at least two inserts (27), wherein the inserts (27) are configured for introducing or removing a maintenance tool in different conduit directions.

17. Maintenance device according to claim 8, comprising at least two chambers (25, 28) with forming housing portions (24, 26).

18. Maintenance device for an elongated, tubular hollow body (2) which is configured for conducting a fluid, with an adapter (3) as part of a sealing device (4), which adapter can be attached to the hollow body (2) in a sealing manner, has a surface (7) pointing away from the hollow body (2) and jointly forms a working region (9) allowing access to the hollow body (2), and with a sealing device (4) which is provided for sealing the working region (9) from an environment (30) of the hollow body (2), comprising a housing (19) which is provided to form at least one chamber (25, 28), which can be separated from the working region (9) by means of the sealing device (4), and which comprises a displaceable insert (27) which is configured for introducing a maintenance tool into the hollow body (2).

19. Maintenance device according to claim 18, wherein the housing (19) is arranged on the sealing device (4).

20. Maintenance device according to claim 18, wherein the housing (19) can be moved relative to the sealing device (4).

21. Maintenance device according to claim 18, wherein the housing (19) is arranged on the adapter (3).

22. Maintenance device according to claim 18, wherein the insert (27) has a longitudinal extension running at least partly transversely to the hollow body (2).

23. Maintenance device according to claim 18, wherein the insert (27) is configured so as to be curved in its longitudinal direction.

24. Maintenance device according to claim 18, wherein the insert (27) has throughflow openings (29).

25. Maintenance device according to claim 18, comprising at least two chambers (25, 28) with forming housing portions (24, 26).

26. Maintenance device according to claim 18 with at least two inserts (27), wherein the inserts (27) are configured for introducing a maintenance tool in opposing conduit directions.

27. Maintenance device according to claim 18, wherein the insert (27) can be pivoted about an axis (46) which is transverse with respect to the longitudinal axis of the conduit.

28. Maintenance device according to claim 18, wherein the housing is configured for direct fastening on the hollow body.

29. Maintenance device according to claim 18, wherein the sealing device is constructed from at least four shell-shaped elements.

30. Maintenance device according to claim 18, wherein the sealing device has at least one seal which acts on its outer circumferential side for sealing with respect to the housing.

31. Maintenance device according to claim 30, wherein the seal can be fastened to the sealing device via a flange which has a sealing seat.

32. Maintenance device according to claim 18, wherein the sealing device can be moved via a ram which can be guided through the housing.

33. Maintenance device according to claim 18, wherein, on one side, the sealing device has a sealing plane which extends perpendicularly with respect to the work region.

34. Maintenance device according to claim 18, wherein the housing has a receptacle which has a guiding face and into which the sealing device can be moved for transfer into a sealing position.

35. Maintenance device according to claim 18, comprising a milling device which has at least two milling tools which can be operated simultaneously.

36. Method for maintaining an elongated, tubular hollow body (2) which is configured for conducting a fluid, the method comprising:
providing a sealing device adapted to be attached to the hollow body (2), wherein the sealing device (4) comprises an adapter (3), wherein the adapter (3) has a surface (7) facing away from the hollow body (2), wherein the adapter (3) forms a working region (9) allowing access to the hollow body (2) for forming an opening in the hollow body (2), the working region (9) being sealed by a sealing action with the sealing device (4) from an environment of the hollow body (2), wherein the sealing device (4) has moveable parts resting on the surface (7) of the adapter (3) and adapted to move relative to the hollow body (2) in a first direction (A) and a second direction (B) extending transversely to the first direction (A);

attaching the adapter (3) to the hollow body (2) in a sealing manner, accessing the working region (9) by displacing at least one of the moveable parts that is a curved part (11) along the hollow body (2) across the working region (9) while maintaining said sealing action.

37. Method according to claim 36, wherein, for forming an opening, a functional unit (12), which comprises a cutting tool acting on a wall of the hollow body (2), can be moved, by moving the moveable parts of the sealing device (4), both in a first direction (A) and transversely thereto in a second direction (B) and in this case cuts into a wall of the hollow body (2), the working region (9) being further sealed from the environment (30).

38. Method according to claim 37, wherein the movement of the cutting tool is carried out successively first in a direction (A) and then in a direction transverse to the first direction (B).

39. Method according to claim 36, wherein the opening becomes accessible by moving apart the moveable parts (11) of the sealing device (4).

40. Method according to claim 36, wherein a maintenance tool is introduced into an insert (27) and is moved into the hollow body (2) via said insert.

41. Method according to claim 40, wherein the insert (27) guides the maintenance tool out of a direction, which is angled relative to the longitudinal extension of the hollow body (2), in the hollow body (2) in the direction of the longitudinal extension thereof.

42. Method according to claim 40, wherein the maintenance tool experiences a dual deflection in order to pass out of a first position, which is oriented parallel to the hollow body (2), into the hollow body (2) through the maintenance tool (1).

* * * * *